United States Patent
Kim

(10) Patent No.: US 8,005,071 B2
(45) Date of Patent: Aug. 23, 2011

(54) HANDLING REAL-TIME TRANSPORT PROTOCOL (RTP) MEDIA PACKETS IN VOICE OVER INTERNET PROTOCOL (VOIP) TERMINAL

(75) Inventor: Jung-Gi Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1650 days.

(21) Appl. No.: 11/271,854

(22) Filed: Nov. 14, 2005

(65) Prior Publication Data

US 2006/0126604 A1    Jun. 15, 2006

(30) Foreign Application Priority Data

Dec. 2, 2004    (KR) .................. 10-2004-0100678

(51) Int. Cl.
*H04L 12/66* (2006.01)
(52) U.S. Cl. ........ 370/352; 370/356; 370/465; 370/466; 370/401; 370/537; 370/468
(58) Field of Classification Search .................. 370/352, 370/356, 351
See application file for complete search history.

(56) References Cited

U.S. PATENT DOCUMENTS

| | | | |
|---|---|---|---|
| 6,621,834 B1* | 9/2003 | Scherpbier et al. | 370/532 |
| 6,665,317 B1* | 12/2003 | Scott | 370/516 |
| 6,961,346 B1* | 11/2005 | Michalewicz et al. | 370/465 |
| 7,236,483 B2* | 6/2007 | Yeom | 370/352 |
| 2002/0006137 A1* | 1/2002 | Rabenko et al. | 370/466 |
| 2002/0141383 A1* | 10/2002 | Schaefer et al. | 370/352 |
| 2007/0121597 A1* | 5/2007 | Lee et al. | 370/356 |

FOREIGN PATENT DOCUMENTS

| | | |
|---|---|---|
| JP | 4-357735 | 12/1992 |
| JP | 5-191451 | 7/1993 |
| WO | WO 03/052747 | 6/2003 |

OTHER PUBLICATIONS

European Office Action of the European Patent Application No. 05025979, mailed Jan. 26, 2006.
Japanese Decision of Grant issued on Jan. 15, 2008, corresponding to Japanese Patent Application No. 2005-345081.

* cited by examiner

*Primary Examiner* — Joe H Cheng
*Assistant Examiner* — Khaled Kassim
(74) *Attorney, Agent, or Firm* — H.C. Park & Associates, PLC

(57) ABSTRACT

Real-time Transport Protocol (RTP) voice packets in a terminal are handled by: checking whether a communication payload generated at an RTP transmitting side is a silence payload; and accumulating the silence payload instead of transmitting it upon the communication payload being the silence payload, and forming the RTP packet upon the communication payload being a voice payload or upon the number of accumulated silence payloads reaching a predetermined multi-frame limit.

22 Claims, 4 Drawing Sheets

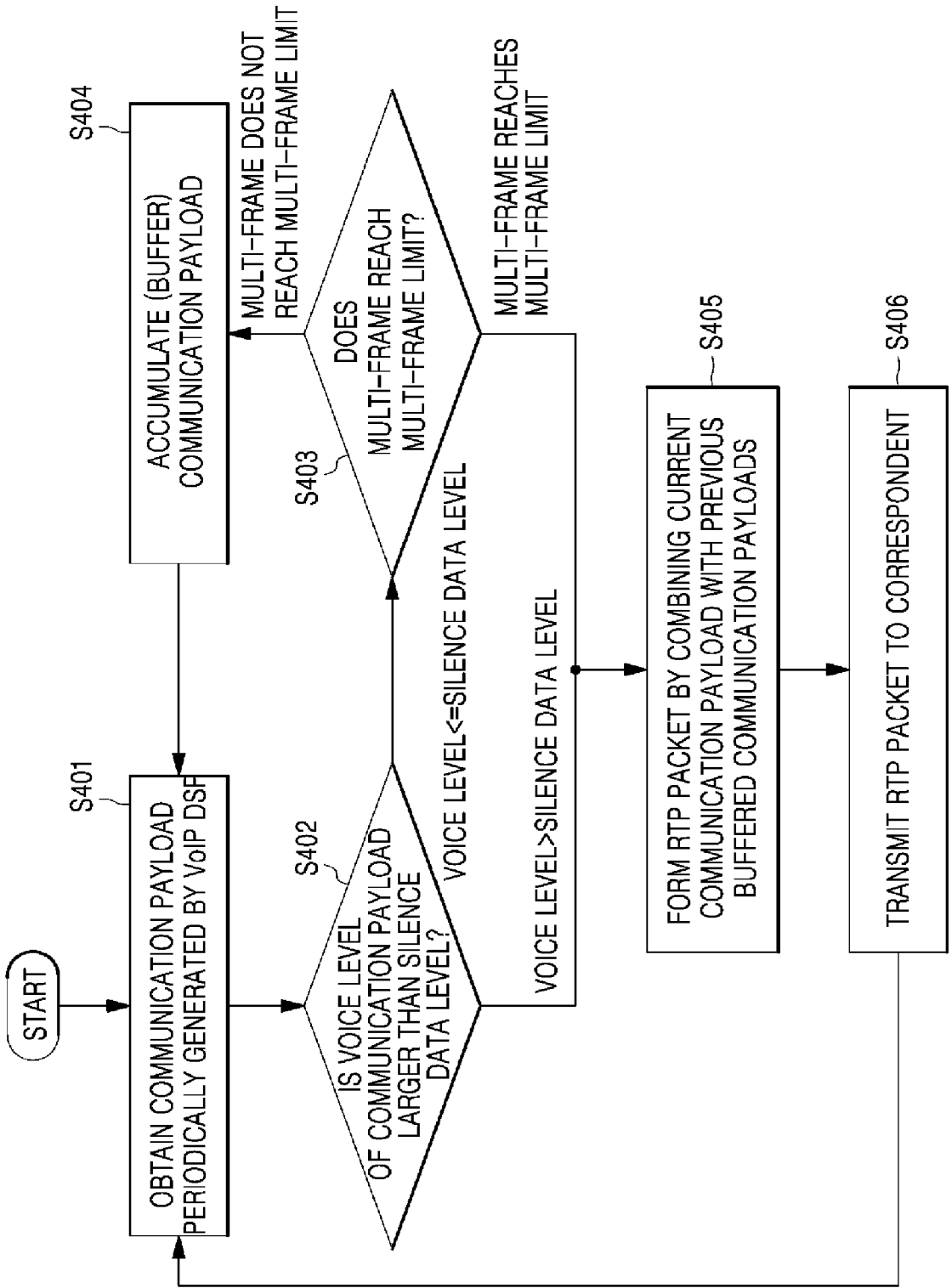

HANDLING REAL-TIME TRANSPORT PROTOCOL (RTP) MEDIA PACKETS IN VOICE OVER INTERNET PROTOCOL (VOIP) TERMINAL

CLAIM OF PRIORITY

This application makes reference to, incorporates the same herein, and claims all benefits accruing under 35 U.S.C. §119 from an application for APPARATUS AND METHOD FOR HANDLING REAL-TIME TRANSPORT PROTOCOL (RTP) MEDIA PACKETS IN VOICE OVER INTERNET PROTOCOL (VoIP) TERMINAL, filed in the Korean Intellectual Property Office on 2 Dec. 2004 and there duly assigned Serial No. 2004-100678.

BACKGROUND OF THE INVENTION

1. Field of the Invention

The present invention relates handling Real-time Transport Protocol (RTP) media packets in a Voice over Internet Protocol (VoIP) terminal, and more particularly, to an apparatus and method of handling RTP media packets in a VoIP terminal, allowing network resources to be more efficiently used in handling voice packets and transmitting the voice packets to a correspondent at either a VoIP wired terminal or a Voice over Wireless LAN (VoWLAN) terminal using Wireless LAN (WLAN) and a VoIP technology.

2. Description of the Related Art

In delivering video, voice, and facsimile messages over the Internet, a Voice over Internet Protocol (VoIP) system transmits real-time media such as voice and video when a user desiring to use the Internet gains access to the Internet by using a Personal Computer (PC), by using any independent device with Internet Protocol applied thereto, or by making a call toward a gateway with an existing Public service Telephone Network (PSTN) phone.

The VoIP system is used because it has the following advantages.

First, integration of a telephone network and a data network reduces investment cost for network equipment. A telephone network for voice communication and a data network for data communication are not disposed separately, such that the investment cost for network equipment is saved. Second, the integrated network reduces management cost and improves efficiency. By handling data and voice with one network, VoIP provides two advantages of management cost reduction and efficiency improvement, unlike an existing network in which data and voice are handled by distinct networks. Third, VoIP is easy to work with Internet-based multimedia services. Using the same network for voice and data makes it possible to provide a number of additional services, such as video conferencing, which are difficult to provide in conventional telephones that adopt circuit switching.

To provide the VoIP service, there is a need for means of discovering and signaling a correspondent to communicate. VoIP signaling includes H.323 of ITU-T and Session Initiation Protocol (SIP) of IETF.

A number of H.323-based VoIP services have been developed. SIP facilitates parsing and compiling tasks as well as provides excellent extensibility. Further, SIP is text-based and thus is easy to implement, unlike H.323.

VoIP end-point devices, e.g., gateways, IP phones, PCs, and the like perform voice communication by continuously transmitting and receiving RTP packets as packetized voice between a sender and a recipient through the RTP protocol on an IP network. However, the consistent RTP packet transmission and reception causes a traffic load on the IP network and impacts overall performance of VoIP equipment by processing RTP packets at a socket interface of a media processor.

The RTP allows an end-to-end transmission service in which real-time data such as audio and video is forwarded using a multicast or unicast network. The RTP has no concept of a connection. Typically, the RTP operates on an upper layer of a User Datagram Protocol (UDP) and utilizes multiplexing and checksum services of the UDP.

In addition to a typical wired VoIP system, Voice over Wireless LAN (VoWLAN) technology, in which voice is forwarded using a widespread WLAN, is recently emerging as a new mobile telephone technology. This is because the VoWLAN realizes lower fees and greater convenience by adding mobility to a wired Internet telephone, i.e., a VoIP telephone.

The VoWLAN forwards voice over a wireless LAN network. In other words, the VoWLAN uses the wireless LAN as a medium, unlike an existing Internet phone working on a wired network.

The VoWLAN provides convenient voice communication by guaranteeing mobility within an area of an Access Point (AP). Further, using an existing network considerably reduces telephony cost as compared with a telephone circuit provider. In particular, the VoWLAN enables a video telephone service desired by customers, and therefore, is advantageous for future customer services.

In VoIP, since voice data is all formed as an RTP packet and is continuously forwarded over a data network, a predetermined network bandwidth is required to perform smooth communication.

To efficiently use network bandwidth in the VoIP system, there is a method with silence that is a characteristic of voice conversation, and an RTP multi-framing method in which voice data is multiplexed into one RTP packet.

The method with silence utilizes a silence processing scheme, such as silence suppression or Voice Activity Detection (VAD)/Comfort Noise Generation (CNG). Typically, a VoIP Digital Signal Processor (DSP) has a VAD/CNG function. When silence is detected by this function, a normal voice payload is not generated but a smaller silence payload indicating the silence is generated. This is sent to the correspondent via the RTP and a local noise is sent to the correspondent during a silence period, such that network bandwidth is saved and smooth communication is maintained.

The multi-framing method is described below.

In VoIP communication, a voice payload periodically generated by a VoIP DSP is formed as an RTP packet and transmitted to a correspondent. To form the RTP packet, protocol header information for transmission, such as an Ethernet header, an IP header, a UDP header, an RTP header, and the like, as well as the voice payload, are added to every RTP packet. This increases the size of actually transmitted data and requires additional bandwidth.

The RTP multi-framing method multiplexes a number of voice payloads into one RTP packet within a predetermined limit and transmits the RTP packet, instead of forming and transmitting the RTP packet directly after a voice payload is generated. This reduces the quantity of additional protocol header information for transmission, such that an entire required network bandwidth is decreased.

The silence-using method and the multi-framing method consume considerable processing time in a terminal or cause a delay while two or three voice packets are being sequentially accumulated, thus deteriorating voice quality. In addition, if a multi-framed RTP packet is lost, a multi-framed amount of the voice packet can be lost all at once, further deteriorating voice quality.

The above problem associated with the VoWLAN terminal is described below in greater detail.

In the VoWLAN phone, battery duration is critical because the VoWLAN phone is a wireless communication terminal.

The silence method requires a consistent processing time because an RTP packet is formed and transmitted over a network by the VoIP technology directly after packetized media data is generated during communication. This causes battery power of the VoWLAN phone to be more rapidly consumed during communication.

In the multi-framing method, generated voice packets are sequentially accumulated by a few frames and then transmitted. This causes voice packet delivery to be delayed, as well as losing a large amount of voice data at once when the packet is lost, resulting in voice quality degradation.

SUMMARY OF THE INVENTION

It is an object of the present invention to provide an apparatus and method of handling RTP media packets in a VoIP terminal, capable of reducing network bandwidth required for VoIP communication while minimizing the impact of multi-framing on voice quality by enhancing RTP packet multi-framing.

According to one aspect of the present invention, a method of handling Voice over Internet Protocol (VoIP) voice packets communicated between terminals in real time is provided, the method comprising: checking whether a communication payload generated at a Real-time Transport Protocol (RTP) transmitting side is a silence payload; and accumulating the silence payload instead of transmitting it upon the communication payload being the silence payload and forming an RTP packet upon the communication payload being a voice payload or upon the number of accumulated silence payloads reaching a predetermined multi-frame limit.

Checking whether a communication payload generated at an RTP transmitting side is a silence payload preferably comprises: determining that an entire communication payload is the voice payload upon the number of voice data having more than a silence reference value within a periodically generated communication payload exceeds a predetermined number; and determining that the entire communication payload is the silence payload upon the number of the voice data having more than the silence reference value does not exceed the predetermined number.

Accumulating the silence payload preferably comprises continuously accumulating the silence payload without transmission until the number of accumulated silence payloads reaches the multi-frame limit and then transmitting the silence payloads without further accumulation.

The multi-frame limit is preferably set such that a correspondent terminal receiving packets from a transmitting terminal does not cause a delay in replaying the voice.

The RTP packet preferably comprises the accumulated silence payloads and a succeeding voice payload.

The communication payload is preferably generated using at least one of a G.711 CODEC, a G.723.1 CODEC, and a G.729 CODEC.

Each terminal is preferably at least one of a VoIP wired terminal and a Voice over Wireless LAN (VoWLAN) terminal.

According to another aspect of the present invention, a method of handling voice packets communicated between terminals in real time using a Voice over Internet Protocol (VoIP) is provided, the method comprising: checking a voice level of a communication payload generated at a Real-time Transport Protocol (RTP) transmitting side; checking whether a number of accumulated communication payloads including the generated communication payload reaches an accumulation limit upon the communication payload determined to be a silence payload by the voice level check; accumulating the generated communication payload upon the number of accumulated communication payloads being no more than the accumulation limit and forming the accumulated communication payloads as an RTP packet upon the number exceeding the accumulation limit; and forming the voice payload as the RTP packet upon the communication payload being determined to be a voice payload by the voice level check.

Checking a voice level preferably comprises: determining that an entire communication payload is a voice payload upon the number of voice data having more than a silence reference value within a periodically generated communication payload exceeding a predetermined number; and determining that the entire communication payload is a silence payload upon the number of the voice having more than the silence reference value does not exceeding the predetermined number.

The RTP packet preferably comprises the accumulated silence payloads and a succeeding voice payload.

The multi-frame limit is preferably set such that a correspondent terminal receiving packets from a transmitting terminal does not cause a delay in replaying the voice.

The communication payload is preferably generated using at least one of a G.711 CODEC, a G.723.1 CODEC, and a G.729 CODEC.

Each terminal is preferably at least one of a VoIP wired terminal and a Voice over Wireless LAN (VoWLAN) terminal.

According to still another aspect of the present invention, a method of handling voice packets communicated between terminals in real time using a Voice over Internet Protocol (VoIP) is provides, the method comprising: VoIP signaling including initiating or terminating a VoIP call by controlling a communication session with a communication correspondent; and media processing including continuously transmitting and receiving packetized voice data to and from the correspondent using a Real-time Transport Protocol (RTP) to achieve communication between the terminals; wherein media processing includes: accumulating silence data generated during voice communication instead of transmitting the silence data in real time; transmitting the accumulated silence data upon the number of accumulated silence data exceeding a multi-frame limit; and immediately transmitting the voice data in real time.

Media processing preferably further comprises: checking whether a communication payload generated at an RTP transmitting side is a silence payload; and accumulating the silence payload instead of transmitting it upon the communication payload being a silence payload and forming an RTP packet upon the communication payload being a voice payload or upon the number of accumulated silence payloads reaching a predetermined multi-frame limit.

The multi-frame limit is preferably set such that a correspondent terminal receiving packets from a transmitting terminal does not cause a delay in replaying the voice.

Each terminal is preferably at least one of a VoIP wired terminal and a Voice over Wireless LAN (VoWLAN) terminal.

The method preferably further comprises receiving an RTP packet, adding a User Datagram Protocol (UDP) header and an IP header to the RTP packet, and transmitting the resultant RTP packet to a correspondent terminal.

Checking whether a communication payload generated at an RTP transmitting side is a silence payload preferably comprises: determining that an entire communication payload is a voice payload upon the number of voice data having more than a silence reference value within a periodically generated communication payload exceeding a predetermined number; and determining that the entire communication payload is a silence payload upon the number of voice data having more than the silence reference value not exceeding the predetermined number.

The silence payloads are preferably continuously accumulated without being transmitted and the silence payloads are preferably not further accumulated upon the number of accumulated silence payloads reaching the multi-frame limit.

According to yet another aspect of the present invention, a terminal communicating using a Voice over Internet Protocol (VoIP) system is provided, the terminal comprising: a VoIP signaling processor adapted to initiate or terminate a VoIP call by controlling a communication session with a communication correspondent; and a media processor adapted to continuously transmit and receive packetized voice data to and from the correspondent using a Real-time Transport Protocol (RTP) protocol to effect communication between the terminals; wherein the media processor is adapted to accumulate silence data generated during voice communication instead of transmitting the silence data in real time, and transmits the accumulated silence data and immediately transmits the voice data in real time upon the number of accumulated silence data exceeding a multi-frame limit.

The terminal preferably further comprises a wired/wireless transmission processor adapted to receive an RTP packet from the media processor, add a User Datagram Protocol (UDP) header and an IP header to the RTP packet, and to transmit the resultant RTP packet to a correspondent terminal.

The multi-frame limit is preferably set such that a correspondent terminal receiving packets from a transmitting terminal does not cause a delay in replaying the voice.

The media processor is preferably adapted to check whether a communication payload generated at an RTP transmitting side is a silence payload, and to accumulate the silence payload instead of transmitting it upon the communication payload being the silence payload, and to form an RTP packet upon the communication payload being a voice payload or upon the number of accumulated silence payloads reaching a predetermined multi-frame limit.

The communication payload is preferably generated using at least one of a G.711 CODEC, a G.723.1 CODEC, and a G.729 CODEC.

The media processor is preferably adapted to determine that an entire communication payload is the voice payload upon the number of voice data having more than a silence reference value within a periodically generated communication payload exceeding a predetermined number and to determine that the entire communication payload is the silence payload upon the number of the voice data having more than the silence reference value not exceeding the predetermined number.

The media processor preferably comprises a VoIP Digital Signal Processor (DSP) adapted to receive voice data from a speaker and to periodically generate a communication payload.

The terminal is preferably at least one of a VoIP wired terminal and a Voice over Wireless LAN (VoWLAN) terminal.

BRIEF DESCRIPTION OF THE DRAWINGS

A more complete appreciation of the present invention, and many of the attendant advantages thereof, will be readily apparent as the present invention becomes better understood by reference to the following detailed description when considered in conjunction with the accompanying drawings, in which like reference symbols indicate the same or similar components, wherein:

FIG. 4 is a flowchart of RTP selective multi-framing according to an embodiment of the present invention.

DETAILED DESCRIPTION OF THE INVENTION

Hereinafter, exemplary embodiments of the present invention are described in greater detail with reference to the accompanying drawings. The present invention is described with respect to a VoWLAN terminal with which advantages of the present invention are maximized. However, the present invention is not limited to the VoWLAN terminal. It will be apparent to those skilled in the art that the present invention can be applied to systems communicating using a VoIP system, e.g., a typical wired VoIP system, and to all communication systems to which RTP multi-framing transmission and reception is applicable.

Figure 1:
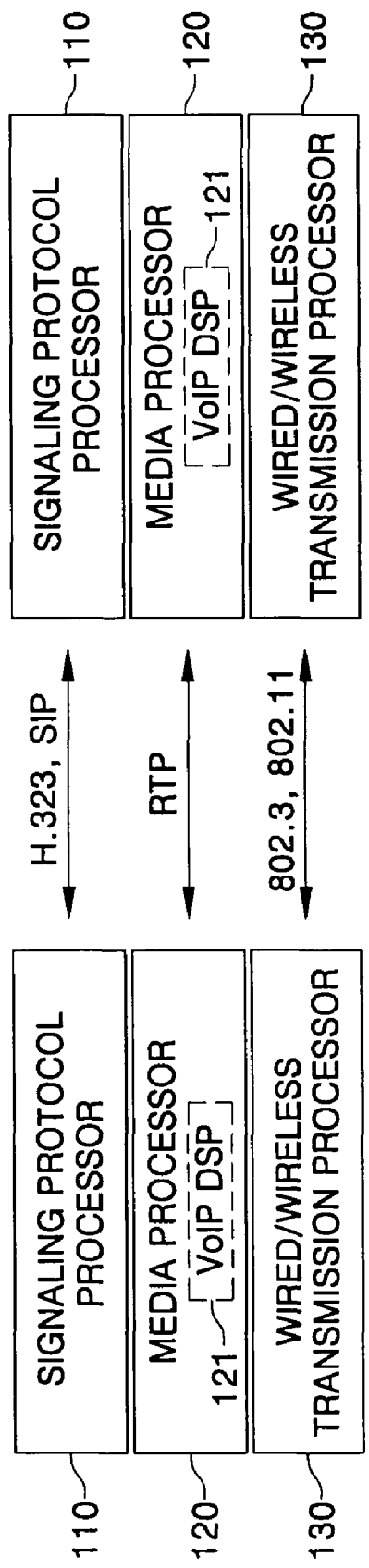
FIG. 1 is a block diagram of a VoIP processing configuration in a VoIP end-point device according to an embodiment of the present invention.

FIG. 1 is a block diagram of a VoIP processing configuration in a VoIP end-point device according to an embodiment of the present invention.

A Voice over Wireless LAN (VoWLAN) terminal wirelessly communicates with an Access Point (AP) using IEEE 802.11-A, B and G standards. The VoWLAN terminal is able to gain access to a system via the AP and communicate with a correspondent terminal. A Session Initiation Protocol (SIP) is used as a signal processing protocol for VoIP call setup, and a Real-time Transport Protocol (RTP) is used for voice communication. As a voice CODEC, G.711, G.729 or G.712 is mainly used. The CODEC serves to convert an analog signal to a digital signal, and vise versa. One of two VoWLAN phones performing VoIP communication continuously transmits and receives RTP packets to and from the other to deliver voice packets. To perform VoIP processing, a VoIP end-point device of FIG. 1 includes a wired/wireless transmission processor 130 that transmits and receives IP packets, a signaling protocol processor 110 for controlling a VoIP communication session, and a media processor 120 for processing voice data.

The wired/wireless transmission processor 130 uses a wired/wireless transmission scheme, such as an IEEE 802.3 wired LAN or an IEEE 802.11 wireless LAN, to transmit and receive IP packets. The signaling protocol processor 110 uses a VoIP signaling protocol, such as H.323 or SIP, to set up and terminate a VoIP call by controlling a communication session with a correspondent. After the signaling protocol processor 110 initiates the VoIP communication session, the media processor 120 continuously transmits and receives packetized voice data by a VoIP DSP 121 to and from the correspondent using the RTP protocol so that communication therebetween is achieved.

Figure 2:
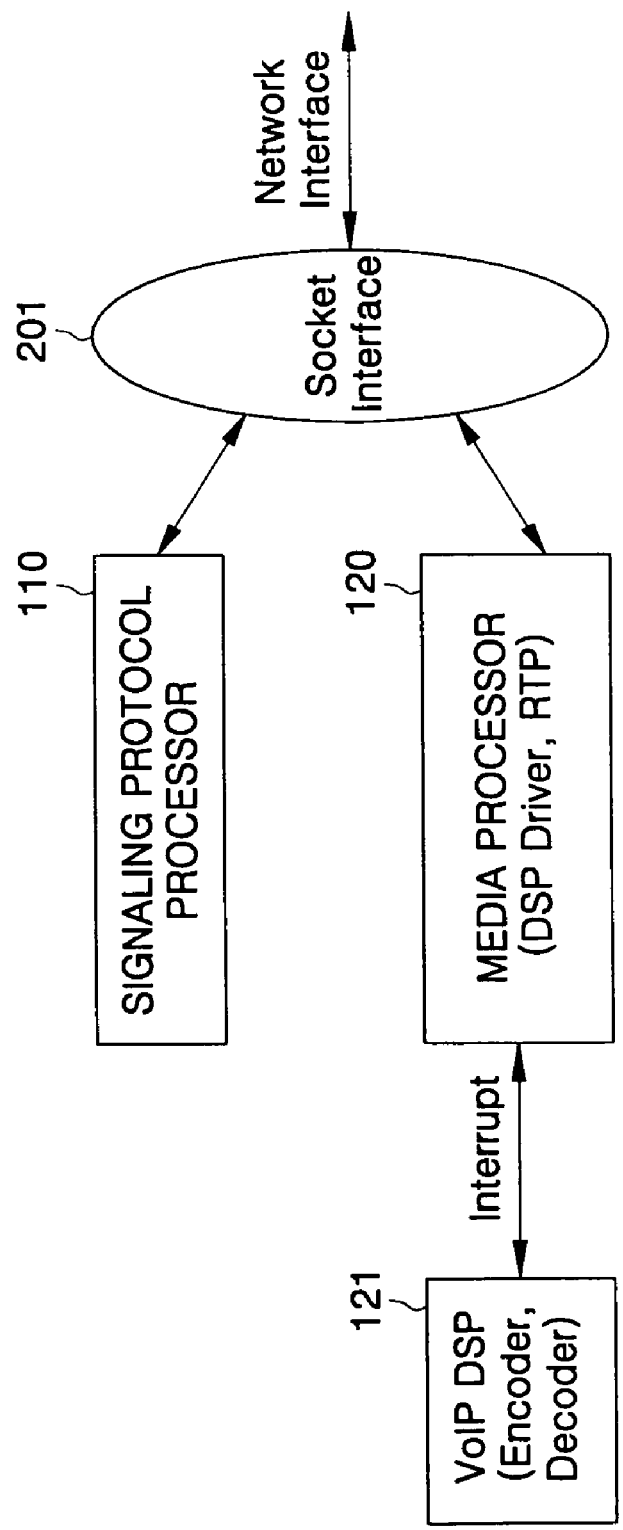
FIG. 2 is a diagram of VoIP processing flow in a VoIP end-point device according to an embodiment of the present invention.

FIG. 2 is a diagram of VoIP processing flow in a VoIP end-point device according to an embodiment of the present invention.

When a communication session is initiated with a communication correspondent by the signaling protocol processor 110, a VoIP end-point device continuously packetizes voice data at an encoder of the VoIP DSP 121 and replays voice at a decoder, as well as transmits and receives the packetized voice data using the RTP protocol until the session is terminated.

Depending on the VoIP voice CODEC used, the voice data, which is generated by the VoIP DSP 121, is continuously produced in a shorter period of 10 msec (in G.711) or in a longer period of 30 msec (in G.723.1) (typically, using interruption). The voice data is formed as an RTP packet by the RTP processor directly after it is generated, and transmitted to the correspondent in real time via a socket interface 201 over a communication network.

RTP transmission and reception of the voice data continuously produced in real time is typically performed by application software in the RTP processor, on which overall performance of the VoIP end-point device depends.

Figure 3:
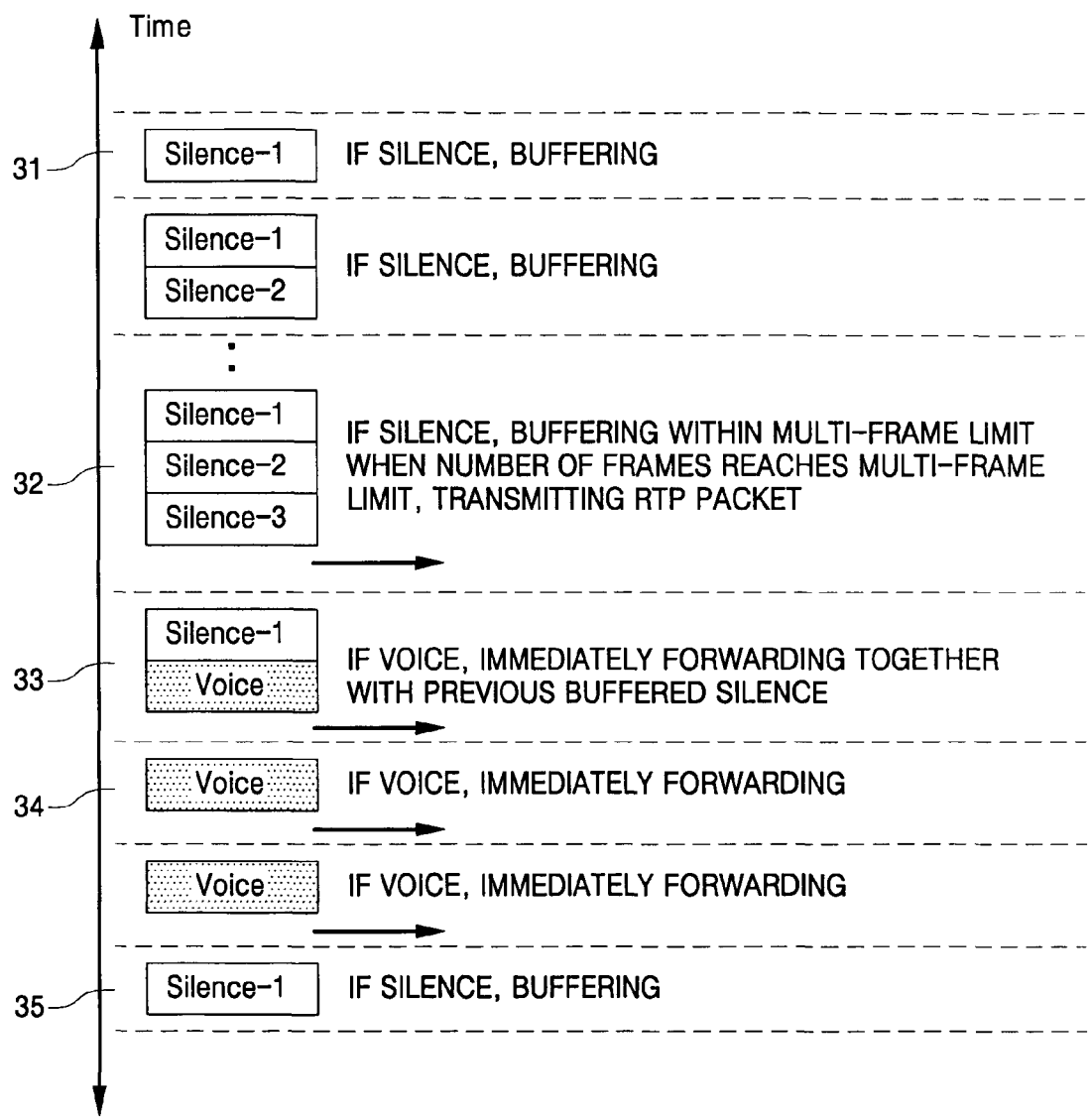
FIG. 3 is a view of a method of handling RTP transmission according to an embodiment of the present invention.

FIG. 3 is a view of a method of handling RTP transmission according to an embodiment of the present invention.

After a call is set up through SIP signaling at the signaling protocol processor 110 as described with reference to FIG. 1, respective VoWLAN phones transmit and receive RTP packets therebetween and replay voice data present in the RTP packets, such that voice communication is achieved.

FIG. 3 shows accumulation of the silence payload and processing of the voice payload of the RTP packet with time in processing the RTP packet using the RTP selective multi-framing method according to an embodiment of the present invention. The embodiment of FIG. 3 will be described in conjunction with a VoIP environment using a G.71 CODEC.

It will be appreciated that, in the RTP selective multi-framing according to an embodiment of the present invention, only silence payloads are multi-framed within a multi-frame limit when a silence period is long, and the accumulated silence payloads and a succeeding voice payload are multi-framed together as one RTP packet when the succeeding voice payload is generated.

The operation in respective periods is described in more detail as follows.

It can be seen that in a period 31, only silence payloads are generated.

In other words, when a G.711 CODEC is used, voice data is generated at 10 msec intervals by the VoIP DSP of the media processor 120. In conventional art, an RTP packet is formed and transmitted to a correspondent over a network directly after voice data is generated. On the other hand, based on the fact that "actual conversation does not fill successive time periods during voice communication, and silence periods in which there is no conversation occupy about 40% of the overall communication", the present invention checks a level of periodically generated voice data, and if the level is lower than a predetermined level, i.e., if the voice data is not substantial conversation data but silence data that is generated during conversation, stores the voice data in an internal buffer instead of immediately transmitting it to the correspondent.

An actual experiment showed that 36.3% of entire voice data corresponds to the silence data, wherein several voice samples are inspected and determined to be silence data if the voice samples have voice level values less than a reference value for which the silence data occupies 30-40% of the entire voice data.

As can be seen in a period 32, the buffering proceeds until voice data having more than a predetermined level, that is, substantial voice data, is generated, or until the number of frames reaches a maximum buffering limit (a multi-framing limit). If the number of the frames reaches the multi-frame limit, an RTP packet corresponding to the silence data is formed and forwarded.

Normally, a multi-frame range that does not impact communication voice quality is 60 to 80 ms. The present invention obtained satisfactory communication voice quality by setting the range value as 40 ms.

A voice payload appears in period 33. The generated voice data is immediately forwarded together with the previous buffered silence data.

The voice payloads continue to be generated in a period 34 and is forwarded immediately.

In a period 35, the silence payload appears again and is buffered.

FIG. 4 is a flowchart of RTP selective multi-framing according to an embodiment of the present invention.

In addition to existing RTP processing, the RTP selective multi-framing of FIG. 4 further includes (i) checking whether communication payloads generated at an RTP transmitting side are silence payloads, (ii) accumulating the silence payloads within such a limit that voice quality deterioration due to voice delay does not arise, and (iii) forming an RTP packet if the voice payload rather than the silence payload is generated, or if the number of accumulated silence payloads reaches the multi-frame limit, and transmitting the RTP packet to a correspondent.

When a communication payload is periodically generated by the VoIP DSP 121 (S401), a voice level of the generated communication payload is checked (S402). In this step, a determination is made as to whether the communication payload is regarded as voice data or silence data.

Detecting and processing silence in the present invention is described below.

If the number of voice data having more than the silence reference value within the voice payload periodically generated by the VoIP DSP 121 exceeds a predetermined number, an entire payload is determined to be a voice payload. If the number of the data having more than the silence reference value is less than the predetermined number, it is handled as the silence payload.

That is, if the level of the voice constituting the communication payload is lower than or equal to the silence data level, the communication payload is determined to be the silence payload. Otherwise, the communication payload is determined to be the voice payload.

If the communication payload is determined to be the silence data, it is necessary to check whether the number of the accumulated communication payloads reaches the multi-frame limit (S403). If the number of the accumulated communication payloads does not yet reach the multi-frame limit, the communication payload continues to be accumulated (or, buffered) (S404). If the number of the accumulated communication payloads reaches the multi-frame limit, a current communication payload is combined with the previous buffered communication payloads to form the RTP packet (S405), and the RTP packet is transmitted to a wireless LAN phone of a correspondent (S406).

If the multi-frame limit is set as 40 ms as in the above-mentioned experiment according to the present invention and a G.711 CODEC is used, a maximum of four frames are allowed to be accumulated since one communication payload occupies 10 ms. This limit can be set to be greater or smaller by a system manager in view of a wireless environment, performance of devices used in the system, etc.

The multi-frame limit can be modified depending on whether priority is placed on wireless resources/duration of a wireless phone battery or communication quality, the two having a trade-off relationship.

On the other hand, if the communication payload is determined to be the voice data, an RTP packet is formed using only a current communication payload when there is no previous accumulated silence communication payload and transmitted, irrespective of the multi-frame limit. If there is a previous accumulated silence communication payload, the current communication payload is combined with the previous communication payloads to form the RTP packet (S405), and the RTP packet is transmitted to the correspondent (S406).

In this case, the RTP packet includes voice data generated at a transmitting side of the VoIP equipment, and an RTP header attached to the voice data. The RTP packet is further added to a UDP header and an IP header at the wired/wireless transmission processor 130 described in FIG. 1 and transmitted to the correspondent.

In the embodiment of FIG. 4, the method by which the RTP processor is capable of easily determining from the voice data itself whether the silence data is contained in the voice data, has been mainly described as including RTP selective multi-framing through silence detection with a G.711 CODEC performed on the generated voice data. This processing with a G.711 CODEC similarly works on a compressed CODEC such as G.723.1 or G.729, only if information on the voice level is fed back to the RTP processor together with the voice data from the VoIP DSP.

With the RTP selective multi-framing described above, it is possible to reduce the number of times an RTP packet is transmitted by a rate of silence generation during communication, compared to transmitting the RTP packet directly after voice data is generated irrespective of speech or silence. This reduces processing power consumption in the VoWLAN phone and increases network transmission efficiency since the packets are buffered and then transmitted all at once. As a result, it is possible to reduce battery consumption in the VoWLAN phone and therefore increase battery lifetime.

To test the method according to the present invention, an environment was actually prepared in which a connection is made to an IEEE 802.11b wireless LAN network via an IEEE 802.3 wired LAN switching hub by using one IEEE 802.11b wireless LAN AP for VoIP communication via a wireless LAN and two wireless LAN phones, and by installing software for packet loss simulation in a network into a Linux PC.

An experiment was performed on the RTP selective multi-framing method according to the present invention by using the two wireless LAN phones having an RFC 3261 SIP protocol processor for VoIP signaling. Two network cards were mounted in the Linux PC, and IP addresses were set so that two VoIP WLAN phones belong to a different network. The WLAN phones used for the test had a Central Processing Unit (CPU) with a VoWLAN chipset, and a 1000 mA L-Ion battery. IEEE 802.11 was used as a wireless LAN standard, and SIP and RTP were used as VoIP protocols.

To test a VoIP communication state, a test voice containing normal conversation content recorded for one minute was repeatedly replayed at a PC to be input to a microphone of the wireless LAN phone, such that several tests were conducted in the same VoIP communication environment.

The experimental results confirmed that the RTP selective multi-framing method according to the present invention reduces the number of times an RTP packet is forwarded by a maximum of 28.1% when a multi-frame limit is set as 4, and saves a corresponding network bandwidth by a maximum of 14.4%, compared to a case where multi-framing is not used.

The network bandwidth savings of 14.4% may not be great for one wireless LAN phone, but is considerable for an AP communicating with a number of wireless LAN phones, because the bandwidth is associated with quantity of data and the saved bandwidth allows an increase in capacity of a wireless LAN AP. This effect appears in a VoIP media gateway having a similar function, as well as in the wireless LAN AP.

Furthermore, the experiment confirmed that the method according to the present invention increases battery duration during communication to a maximum of 270 minutes, i.e., by 42.1%, compared to 190 minutes when multi-framing is not used.

With the present invention, it is possible to reduce a network bandwidth required for VoIP communication while minimizing the impact of multi-framing on voice quality, by applying a multi-framing scheme to silence data generated during voice communication while applying an immediate transmitting scheme to generated voice data. In particular, it is possible to reduce battery consumption in a VoWLAN terminal by reducing processing overhead.

While the present invention has been described with reference to exemplary embodiments thereof, it will be understood by those skilled in the art that various modifications in form and detail can be made therein without departing from the scope of the present invention as defined by the following claims.

What is claimed is:

1. A method of handling Voice over Internet Protocol (VoIP) voice packets communicated between terminals in real time, the method comprising:
   determining whether a communication payload generated at a Real-time Transport Protocol (RTP) transmitting side is a silence payload or a voice payload;
   accumulating the silence payload instead of transmitting the silence payload in real time, upon a determination that the communication payload is a silence payload;
   forming a first RTP packet upon a determination that the communication payload is a voice payload; and
   forming a second RTP packet upon a determination that a number of accumulated silence payloads reaches a multi-frame limit,
   wherein determining whether a communication payload generated at an RTP transmitting side is a silence payload or a voice payload comprises:
   determining that a first communication payload is a voice payload upon a determination that an amount of sound data above a silence reference value within the first communication payload exceeds a threshold value; and
   determining that the first communication payload is a silence payload upon a determination that the amount of sound data above the silence reference value within the first communication payload does not exceed the threshold value.

2. The method of claim 1, further comprising:
   transmitting the second RTP packet to a correspondent terminal,
   wherein accumulating the silence payload comprises accumulating successive silence payloads until the number of accumulated silence payloads reaches the multi-frame limit and wherein the second RTP packet comprises the accumulated silence payloads.

3. The method of claim 1, further comprising:
transmitting the first RTP packet to a correspondent terminal,
wherein the first RTP packet comprises at least one accumulated silence payload and a succeeding voice payload.

4. The method of claim 3, wherein the multi-frame limit is set such that a correspondent terminal to receive RTP packets does not replay the voice with a delay.

5. The method of claim 1, wherein the communication payload is generated using at least one of a G.711 CODEC, a G.723.1 CODEC, and a G.729 CODEC.

6. The method of claim 1, wherein each terminal comprises at least one of a VoIP wired terminal and a Voice over Wireless LAN (VoWLAN) terminal.

7. A method of handling voice packets communicated between terminals in real time using a Voice over Internet Protocol (VoIP), the method comprising:
determining a voice level of a first communication payload generated at a Real-time Transport Protocol (RTP) transmitting side;
accumulating the first communication payload upon a determination that the voice level of the first communication payload is below a silence threshold;
determining whether a number of accumulated communication payloads reaches an accumulation limit;
forming the accumulated communication payloads as a second RTP packet upon a determination that the number reaches the accumulation limit; and
forming at least the first communication payload as a first RTP packet upon a determination that the voice level of the first communication payload is above the silence threshold,
wherein determining a voice level comprises:
determining that the first communication payload is a voice payload upon a determination that an amount of sound data above a silence reference value within the first communication payload exceeds a threshold value; and
determining that the first communication payload is a silence payload upon a determination that the amount of sound data above the silence reference value does not exceed the threshold value.

8. The method of claim 7, wherein the first RTP packet comprises at least one accumulated silence payload and a succeeding voice payload.

9. The method of claim 7, wherein the multi-frame limit is set such that a correspondent terminal to receive RTP packets does not replay the voice with delay.

10. The method of claim 7, wherein the communication payload is generated using at least one of a G.711 CODEC, a G.723.1 CODEC, and a G.729 CODEC.

11. The method of claim 7, wherein each terminal comprises at least one of a VoIP wired terminal and a Voice over Wireless LAN (VoWLAN) terminal.

12. A method of handling voice packets communicated between terminals in real time using a Voice over Internet Protocol (VoIP), the method comprising:
VoIP signaling comprising initiating or terminating a VoIP call by controlling a communication session with a communication correspondent; and
media processing comprising:
continuously transmitting and receiving packetized sound data to and from the communication correspondent using a Real-time Transport Protocol (RTP);
accumulating silence data generated during voice communication instead of transmitting the silence data in real time;
transmitting the accumulated silence data upon a determination that a number of accumulated silence data reaches a multi-frame limit;
transmitting, without accumulating, voice data generated during voice communication,
determining whether a communication payload generated at an RTP transmitting side is a silence payload or a voice payload;
accumulating the silence payload instead of transmitting the silence payload in real time, upon a determination that the communication payload is a silence payload;
forming a first RTP packet upon a determination that the communication payload is a voice payload; and
forming a second RTP packet upon a determination that a number of accumulated silence payloads reaches a multi-frame limit,
wherein determining whether a communication payload generated at an RTP transmitting side is a silence payload or a voice payload comprises:
determining that a first communication payload is a voice payload upon a determination that an amount of sound data above a silence reference value within the first communication payload exceeds a threshold value; and
determining that the first communication payload is a silence payload upon a determination that the amount of voice data above the silence reference value within the first communication payload does not exceed the threshold value.

13. The method of claim 12, wherein the multi-frame limit is set such that a correspondent terminal to receive RTP packets does not replay the voice with a delay.

14. The method of claim 12, wherein each terminal comprises at least one of a VoIP wired terminal and a Voice over Wireless LAN (VoWLAN) terminal.

15. The method of claim 12, further comprising receiving an RTP packet, adding a User Datagram Protocol (UDP) header and an Internet Protocol (IP) header to the RTP packet, and transmitting the resultant RTP packet to a correspondent terminal.

16. The method of claim 12, wherein the silence payloads are accumulated successively and wherein the silence payloads are not further accumulated upon a determination that a number of accumulated silence payloads reaches the multi-frame limit.

17. A terminal to communicate using a Voice over Internet Protocol (VoIP) system, the terminal comprising:
a VoIP signaling processor adapted to initiate or terminate a VoIP call by controlling a communication session with a communication correspondent; and
a media processor adapted to:
continuously transmit and receive packetized sound data to and from the communication correspondent using a Real-time Transport Protocol (RTP);
accumulate silence data generated during voice communication instead of transmitting the silence data in real time;
transmit the accumulated silence data upon a determination that a number of accumulated silence data reaches a multi-frame limit; and
transmit, without accumulating, voice data generated during voice communication,
wherein the media processor is adapted to determine whether a communication payload generated at an RTP transmitting side is a silence payload or a voice payload, to accumulate the silence payload instead of transmitting the silence payload in real time, upon a determination that the communication payload is a silence payload, to form a first RTP packet upon a determination that the communication payload is a voice payload, and to form a second RTP packet upon a determination that a number of accumulated silence payloads reaches the multi-frame limit, wherein the media processor is adapted to determine that a first communication payload is a voice payload upon a determination that an amount of sound data above a silence reference value within the first communication payload exceeds a threshold value and to determine that the first communication payload is a silence payload upon a determination that the amount of the voice data above the silence reference value does not exceed the threshold value.

18. The terminal of claim 17, further comprising a wired/wireless transmission processor adapted to receive an RTP packet from the media processor, add a User Datagram Protocol (UDP) header and an Internet Protocol (IP) header to the RTP packet, and to transmit the resultant RTP packet to a correspondent terminal.

19. The terminal of claim 17, wherein the multi-frame limit is set such that a correspondent terminal to receive RTP packets does not replay the voice with a delay.

20. The terminal of claim 17, wherein the communication payload is generated using at least one of a G.711 CODEC, a G.723.1 CODEC, and a G.729 CODEC.

21. The terminal of claim 17, wherein the media processor comprises a VoIP Digital Signal Processor (DSP) adapted to receive voice data from a speaker and to periodically generate a communication payload.

22. The terminal of claim 17, wherein the terminal comprises at least one of a VoIP wired terminal and a Voice over Wireless LAN (VoWLAN) terminal.

* * * * *